United States Patent
Suzuki et al.

[11] Patent Number: 5,875,069
[45] Date of Patent: Feb. 23, 1999

[54] CLAW-POLE SYNCHRONOUS MOTOR FOR DRIVING A STORAGE DEVICE

[75] Inventors: Yuzuru Suzuki, Shizuoka-ken; Sakae Fujitani, Hamakita, both of Japan

[73] Assignee: Minebea Co., Ltd., Nagano-Ken, Japan

[21] Appl. No.: 874,079

[22] Filed: Jun. 12, 1997

[30]     Foreign Application Priority Data

Jun. 26, 1996  [JP]  Japan ................................. 8-166475

[51] Int. Cl.⁶ ................................................. G11B 5/016
[52] U.S. Cl. ................................ 360/99.04; 360/99.05
[58] Field of Search ........................... 360/99.04, 99.05, 360/99.08, 99.12

[56]                    References Cited

U.S. PATENT DOCUMENTS

| | | | |
|---|---|---|---|
| 5,304,879 | 4/1994 | Suzuki | 360/99.04 |
| 5,691,583 | 11/1997 | Suzuki | 310/49 R |

*Primary Examiner*—A. J. Heinz
*Attorney, Agent, or Firm*—Howell & Haferkamp, L.C.

[57]                    ABSTRACT

There is provided a storage device whose cost is greatly reduced by employing a low-cost claw-pole two-phase synchronous motor as a spindle motor in which the rotation nonuniformity and vertical fluctuation of its shaft are suppressed while suppressing the leakage magnetic flux, by employing an open-loop scheme for motor control, and by mounting a drive circuit on the side of a control LSI for controlling the device to omit a motor control drive circuit (driving IC). The number of basic steps of the claw-pole two-phase synchronous motor is set to 48 steps or more. Stator pole teeth between both sub-assemblies are located within the range of 90°±5° in electrical angle. One end surface of a rotor having a field magnet is subjected to index magnetization also serving as rotor chuck magnetization. A magnetic shield plate is arranged on the surface of the rotor opposite to the magnetic head. The claw-pole two-phase synchronous motor having the above arrangement is used as a spindle motor, thereby realizing a low-cost storage device having a simple motor drive circuit by open-loop control.

18 Claims, 4 Drawing Sheets

CLAW-POLE SYNCHRONOUS MOTOR FOR DRIVING A STORAGE DEVICE

BACKGROUND OF THE INVENTION

1. Field of the Invention

The present invention relates to a storage device such such as FDD, HDD, CD-ROM, and the like.

2. Description of the Prior Art

A storage device of this type is constituted by a chassis attached with or housing constituent components of the device, a spindle motor for rotating information recording disks, magnetic heads for reading/writing information in/from the information recording disks, an actuator for driving these magnetic heads in the radial direction of the information recording disks, and a control circuit for controlling the operation of the whole device. As the spindle motor, which requires the highest cost and precision of all the constituent components, a three-phase brushless DC motor has conventionally been used due to high performance requirements.

However, the three-phase brushless DC motor cannot cope with demands for further cost reductions in recent years, so a lower-cost motor is required. When a claw-pole two-phase synchronous motor is considered in the light of this problem, since this motor is basically a stepping motor, its shaft speed greatly varies, and its rotating shaft vertically fluctuates depending on the state of magnetic excitation. For this reason, the claw-pole two-phase synchronous motor fails to attain smooth rotation required for a spindle motor, and it cannot provide satisfactory effects. In addition, a motor drive excitation coil functions like a solenoid coil due to its specific motor arrangement so that a large leakage magnetic flux is generated on every excitation and the leaked flux links to the magnetic head, resulting in a low S/N ratio of the head output signal.

SUMMARY OF THE INVENTION

The present invention has been made in consideration of the above situation, and has as its object to provide a storage device whose cost is greatly reduced by employing, as a spindle motor, a low-cost, claw-pole, two-phase synchronous motor in which the rotation nonuniformity and vertical fluctuation of the shaft as the problems of the claw-pole two-phase synchronous motor are suppressed while suppressing the leakage magnetic flux, by employing an open-loop scheme of a motor, and by arranging a drive circuit on the side of a control circuit for controlling the device and mounting it on a control LSI to omit a motor control drive circuit (drive IC).

To achieve the above object, according to the present invention, there is provided a storage device comprising, as a spindle motor for driving magnetic recording disks, a claw-pole synchronous motor having a rotor constituted by an armature prepared by stacking, in an axial direction of the motor, a plurality of armature coils each sandwiched between two stator yokes with pole teeth formed by bending soft steel plates, and a permanent magnet arranged to oppose the pole teeth of the armature with a small gap therebetween.

The claw-pole synchronous motor preferably has at least 48 basic steps to obtain smooth rotation.

One end surface of the rotor of the claw-pole synchronous motor has a chuck magnet for chucking an information recording disk, and the other end surface is subjected to magnetization for index signal generation also serving as rotor chuck magnetization.

An end surface of the spindle motor corresponding to magnetic heads for reading/writing recording information of the recording device has a magnetic shield plate, and the magnetic shield plate has raised portions at outer and inner peripheral edges to increase the rigidity.

The spindle motor employs an open-loop scheme for drive control, and the motor has a drive circuit on the side of a device control circuit.

DETAILED DESCRIPTION OF PREFERRED EMBODIMENT

An embodiment of the present invention will now be described below with reference to the accompanying drawings.

Figure 1A:
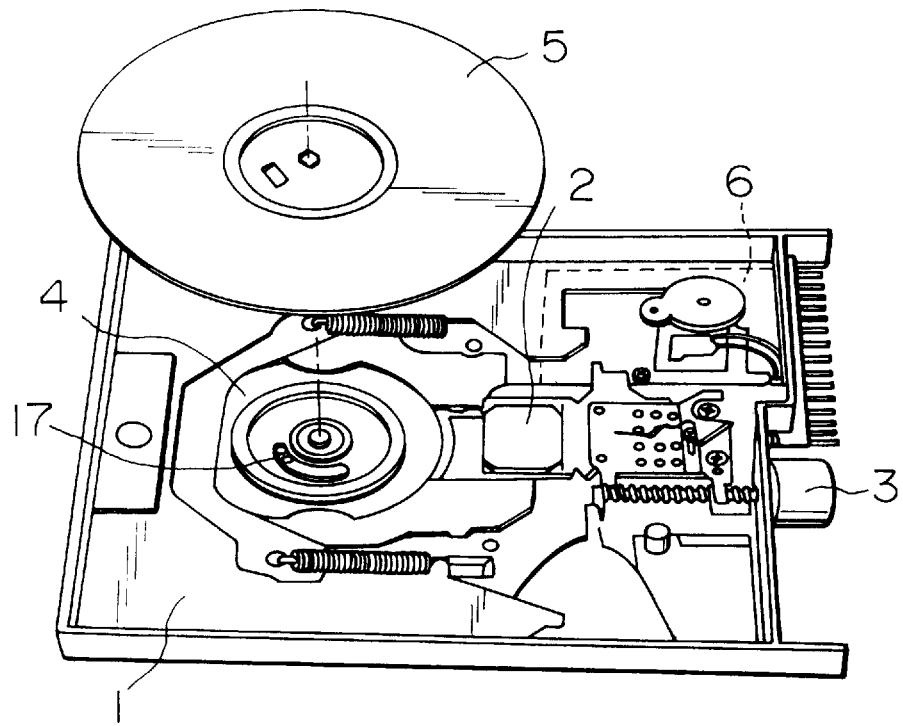
FIG. 1A is a perspective view showing the internal arrangement of an FDD device as an example of a storage device according to the present invention with a magnetic recording disk as an information recording disk removed upward.
Figure 1B:
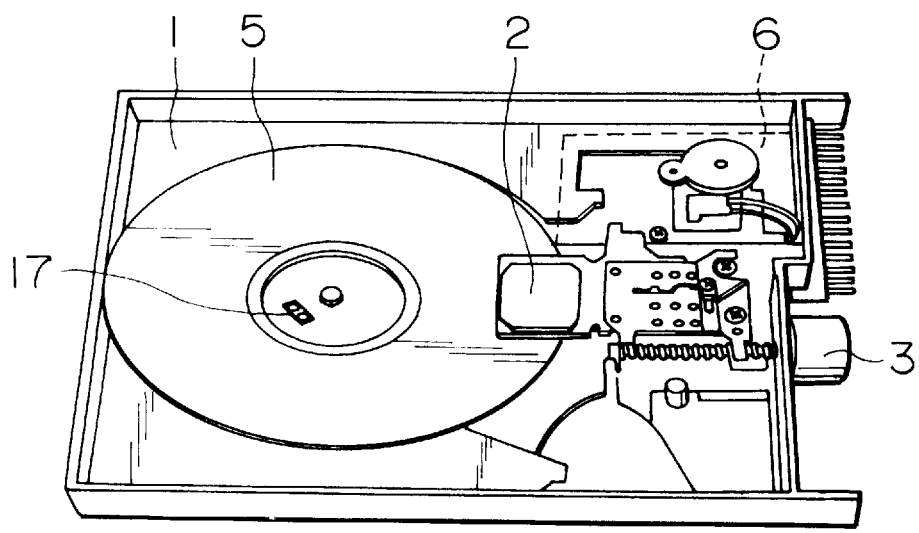
FIG. 1B is a perspective view showing the internal arrangement with the magnetic recording disk loaded.

FIG. 1A is a perspective view showing the internal arrangement of an FDD as an example of a storage device according to the present invention with a magnetic recording disk as an information recording disk removed upward, and FIG. 1B is a perspective view showing the internal arrangement with the magnetic recording disk loaded.

In FIGS. 1A and 1B, reference numeral 1 denotes a frame; 2, a read/write head; 3, an actuator for driving the magnetic head 2 in the radial direction of a magnetic recording disk 5; 4, a spindle motor for rotating the magnetic recording disk 5; 5, the magnetic recording disk (floppy disk) for magnetically recording information; and 6, a control circuit with an I/O connector for the FDD device which is mounted on the lower surface of the frame 1. The spindle motor 4, the magnetic head 2, and the actuator 3 are mounted on the frame 1. The magnetic recording disk 5 is placed on the spindle motor 4. The magnetic head 2 pinches the two surfaces of the disk 5 to record or reproduce information. The magnetic head 2 is driven by the actuator 3 to scan the magnetic recording disk 5 from innermost track 79 to outermost track 0 in the radial direction of the disk 5.

Figure 2:
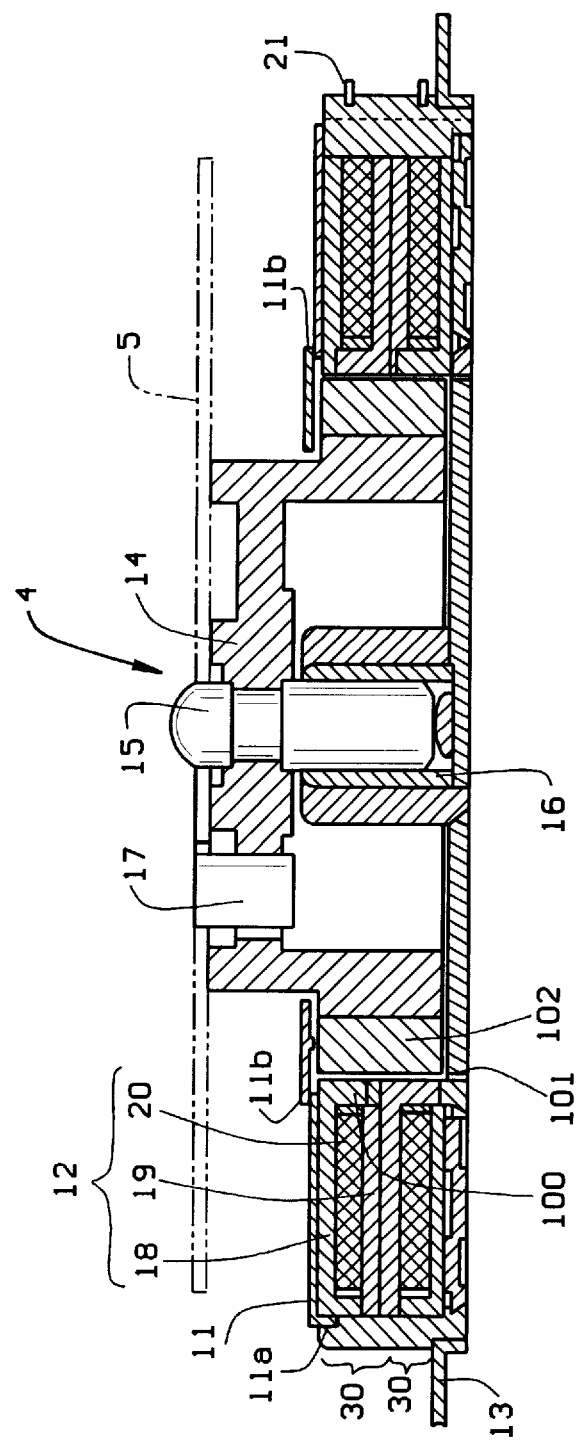
FIG. 2 is a longitudinal sectional view of the spindle motor of the FDD device shown in FIGS. 1A and 1B.

FIG. 2 is a longitudinal sectional view showing the arrangement of the spindle motor 4 shown in FIG. 1A. Reference numeral 11 denotes a shield plate; 12, a stator assembly; 13, a base; 14, a rotor assembly; 15, a shaft; 16, a bearing; 17, a drive pin; 18, stator yokes 19; stator yokes 20, a coil; and 21, a coil terminal.

Describing the motor referring to FIG. 2 in detail, the stator yoke 18 having 12 or more pole teeth 100 on its inner circumferential surface formed by bending a soft magnetic steel plate, and the stator yoke 19 having the same structure as that of the stator yoke 18 face each other on the base 13 so as to shift their pole teeth 100 at an electrical angle of 180°. The stator yokes 18 and 19 sandwich the coil 20 formed by winding a polyurethane-coated copper wire, thereby constituting a sub-assembly 30. Two such subassemblies 30 each having this arrangement are stacked back to back in the axial direction of the motor so as to shift the pole teeth 100 at an electrical angle of 90°±5°, thereby constituting the stator assembly 12. The bearing 16 supporting the shaft 15 as a rotation center is mounted on the stator assembly 12 to be concentric with the pole teeth 100 of the stator assembly 12. The three components, i.e., the base 13, the stator assembly 12, and the bearing 16 are integrally molded with a polymeric material. In this case, the number of pole teeth 100 of each of the stator yokes 18 and 19 is set at 12 or more due to the following reason. If the number of pole teeth is 12 or less, the motor has only 48 steps or less per rotation, and the rotation speed nonuniformity increases to 4.0% or more. As a result, the motor cannot be used as a spindle motor. The positions of the pole teeth 100 between sub-assemblies 30 are defined as above because the motor cannot rotate smoothly and the rotation nonuniformity increases to 4.0% or more if the positions fall out of the prescribed range (90°±5°).

The shaft 15 is arranged at the center. The outer circumferential surface of the rotor assembly 14 consisting of a polymeric material (plastic magnet) containing a magnetic material with a large specific gravity is subjected to field magnetization so as to ensure proper inertia. At the same time, the surface of the rotor assembly 14 opposite to the magnetic recording disk 5 is magnetized so as to chuck the magnetic recording disk 5. The opposite end surface is subjected to index signal generation magnetization so as to suppress vertical motion of the rotor assembly 14 in the axial direction. Then, the rotor assembly 14 is fitted on the bearing 16. At this time, the drive pin 17 for driving the disk is inserted in and fixed to the chuck surface of the rotor assembly 14 for the magnetic recording disk 5. With this arrangement, smooth and stable rotation can be attained.

A permanent magnet 102 is arranged to oppose the pole teeth 100 of the armature with a small gap 101 therebetween.

As a measure against the leakage flux to the magnetic head 2, the shield plate 11 is used. The shield plate 11 is obtained by forming a hole in the inner circumferential surface of a 0.35-mm silicon steel plate to expose the chuck portion of the rotor assembly for the magnetic recording disk 5, and raising inner and outer peripheral surfaces 11a and 11b in the axial direction to obtain high rigidity. The magnetic shield plate 11 is placed to cover the upper surface of the stator assembly 12, and the base 13 is fixed to the frame 1. The fixing may be provided by using a screw or bonding.

As a driving scheme of the claw-pole two-phase synchronous motor, open-loop control is employed because this motor operates in synchronism with an external clock for the synchronous motor. In open-loop control, neither rotor detectors nor a speed detector is used, so a need for a feedback loop is obviated. Further, the circuit is a digital circuit because the motor is driven by an ON/OFF switching mode pulse. Unlike the conventional three-phase brushless motor which is driven upon reception of a weak signal, no circuit need be arranged near the motor, and a motor drive circuit can be arranged on the control circuit side for controlling the FDD device. The motor drive circuit can be incorporated in the LSI. For this reason, the motor requires no dedicated drive circuit (driving IC, circuit board, or the like). The cost of the drive circuit can therefore be greatly reduced.

Figure 3:
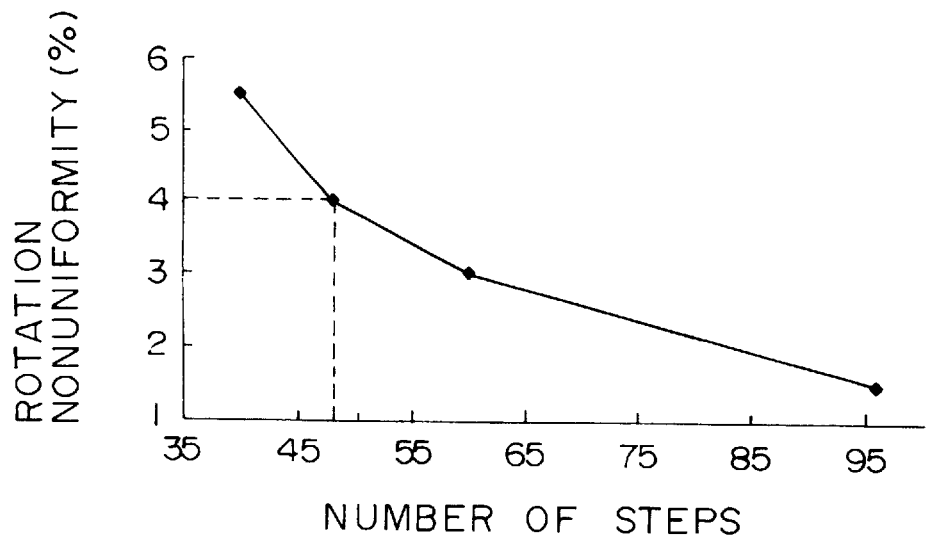
FIG. 3 is a graph showing the relationship between the number of steps (the number of pole teeth of a stator×the number of stators) and the rotation nonuniformity in the spindle motor used for the FDD device according to the present invention.

FIG. 3 is a graph showing the relationship between the number of steps (the number of pole teeth of the stator×the number of stators) and the rotation nonuniformity of the motor. As is apparent from FIG. 3, the rotation nonuniformity greatly increases to 4.0% or more at 48 steps or less.

Figure 4:
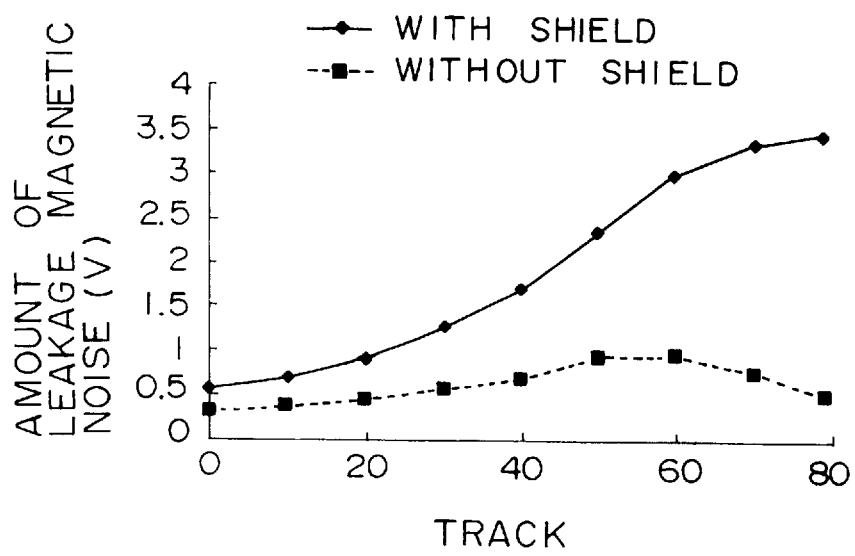
FIG. 4 is a graph showing the presence/absence of a shield plate and the leakage magnetic noise in the spindle motor used for the FDD device according to the present invention.

FIG. 4 is a graph showing the relationship between the presence/absence of the shield plate and the leakage magnetic noise. As is apparent from FIG. 4, the shield plate is effective particularly on the inner circumferential side from track 40 (on track 79 side).

Figure 5:
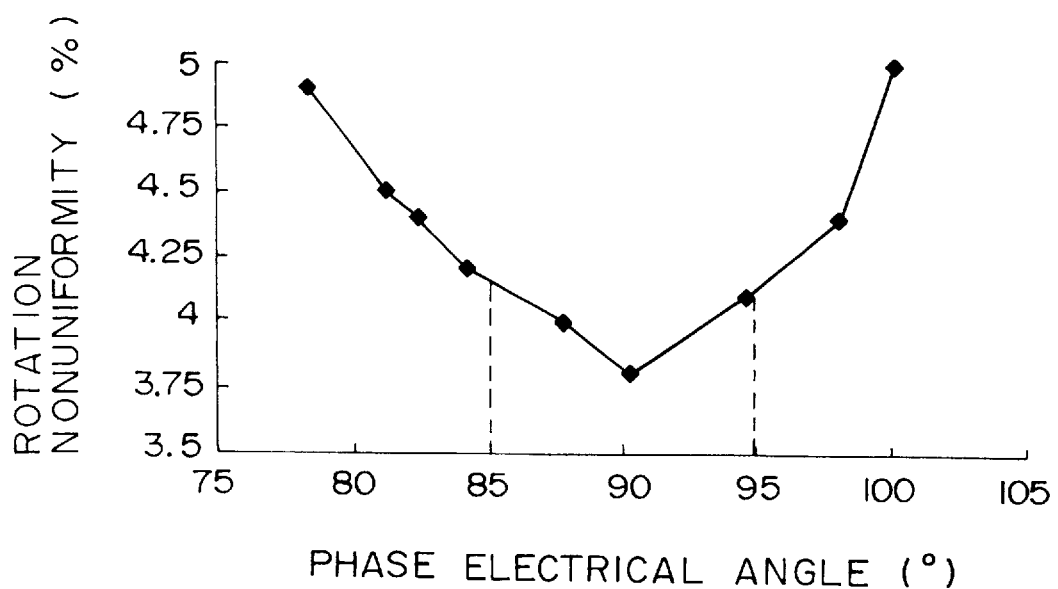
FIG. 5 is a graph showing the relationship between the phase in electrical angle of the sub-assemblies 30 (the positions of the pole teeth) and the rotation nonuniformity in the spindle motor used for the FDD device according to the present invention.

FIG. 5 is a graph showing the relationship between the phase in electrical angle of the sub-assemblies 30 (the positions of the pole teeth) and the rotation nonuniformity. As is apparent from FIG. 5, the rotation nonuniformity greatly increases to 4.0% or more outside the range of 90°±5°.

With the above arrangement, the FDD device can be constituted using the claw-pole two-phase synchronous motor which has not conventionally been employed as an FDD spindle motor, as a motor free from any leakage magnetism while suppressing rotation nonuniformity. The cost of the motor portion and that of the motor control circuit portion can be reduced, realizing a very-low-cost FDD device.

The above embodiment exemplifies the claw-pole synchronous motor. The present invention can be similarly applied to a synchronous motor of various types.

In the above embodiment, the inner peripheral edge of the magnetic shield plate arranged as a measure against the leakage magnetic flux is bent upward. However, the inner peripheral edge may be bent downward like the outer peripheral edge. In addition, the magnetic shield plate may be arranged at only a portion (particularly the lower surface portion of the magnetic head) on the circumference.

As has been described above, according to the present invention, a low-cost claw-pole two-phase synchronous motor can be employed as a spindle motor for various high-precision storage devices in which the rotation nonuniformity and vertical fluctuation of the shaft are suppressed. The cost of the device can be greatly reduced by omitting any drive control circuit dedicated for the motor, and employing open-loop control requiring neither rotor detectors nor a speed detector.

What we claimed is:

1. A magnetic storage device for magnetically reading and writing data onto a driven magnetic recording disk comprising a claw-pole synchronous motor as a spindle motor for driving said magnetic recording disks, characterized in that said motor has a rotor constituted by an armature prepared by stacking, in an axial direction of said motor, a plurality of armature coils each sandwiched between two stator yokes with pole teeth formed by bending soft steel plates, a permanent magnet arranged to oppose said pole teeth of said armature with a small gap therebetween; and a magnetic shield plate provided on an end surface of said spindle motor corresponding to a magnetic head for reading/writing recording information.

2. A device according to claim 1, wherein said claw-pole synchronous motor used as said magnetic recording disk drive spindle motor has at least 48 (basic steps).

3. A device according to claim 1, wherein a first end surface of said rotor of said rotor of said claw-pole synchronous motor is magnetized for chucking an information recording disk, and a second end surface of said rotor is subjected to rotor attracting magnetization.

4. A device according to claim 3, wherein the rotor chuck magnetization also serves as magnetization for index signal generation.

5. The device of claim 3, wherein said claw-pole synchronous motor has at least 48 basic steps.

6. The device of claim 3, wherein a magnetic shield plate is provided on an end surface of said spindle motor.

7. A device according to claim 1, wherein said storage device is an FDD (Floppy Disk) device.

8. A device according to claim 1, wherein said spindle motor employs an open-loop scheme for drive control.

9. A device according to claim 1, wherein said spindle motor has a drive circuit on the side of a drive device control circuit.

10. A device according to claim 1, wherein said magnetic shield plate has bent portions at outer and inner peripheral edges.

11. The magnetic storage device of claim 1 further characterized in that said claw-pole synchronous motor is an inner-rotor type motor.

12. The device of claim 1, further characterized in that a drive pin for driving the magnetic recording disk is inserted in and fixed to the first end surface of said rotor.

13. A storage device for magnetically reading and writing data onto a driven magnetic recording disk comprising a claw-pole synchronous motor as a spindle motor for driving said magnetic recording disk, said motor having a rotor comprising a plurality of axially-stacked armature coils each sandwiched between two stator yokes with a plurality of pole teeth, a permanent magnet arranged to oppose said pole teeth of said armature with a small gap therebetween, and a first end surface of said rotor is magnetized to chuck the magnetic recording disk, a second end surface of said rotor is subjected to rotor attracting magnetization, and a drive pin for driving the magnetic recording disk is inserted in and fixed to the magnetized first surface of said rotor.

14. The storage device of claim 13 wherein the claw-pole synchronous motor is an inner-rotor type motor.

15. A storage device for magnetically reading and writing data onto a driven magnetic recording disk, characterized by having a claw-pole synchronous motor having at least 48 steps per rotation driving said magnetic recording disk, a rotor having a first end surface magnetized for chucking an information recording disk, a second end surface subjected to rotor attracting magnetization, and a drive pin for driving the magnetic recording disk is inserted in and fixed to the magnetized first surface of said rotor.

16. The device of claim 15, and further characterized by an open-loop circuit driving the motor.

17. The device of claim 16, and further characterized by the absence of a dedicated drive circuit.

18. The storage device of claim 15 further characterized in that said claw-pole synchronous motor is an inner-rotor type motor.

* * * * *